United States Patent
Hince (10) Patent No.: US 6,699,707 B1
(45) Date of Patent: *Mar. 2, 2004

(54) MICROBIAL ENZYME-ENHANCED ORGANIC-INORGANIC SOLID-CHEMICAL COMPOSITION AND METHODS FOR ANAEROBIC BIOREMEDIATION

(75) Inventor: Eric Christian Hince, Campbell Hall, NY (US)

(73) Assignee: Geovation Technologies, Inc., Florida, NY (US)

( * ) Notice: Subject to any disclaimer, the term of this patent is extended or adjusted under 35 U.S.C. 154(b) by 549 days.

This patent is subject to a terminal disclaimer.

(21) Appl. No.: 09/690,395

(22) Filed: Oct. 17, 2000

Related U.S. Application Data (63) Continuation-in-part of application No. 09/441,484, filed on Nov. 17, 1999, now Pat. No. 6,463,531.

(51) Int. Cl.$^7$ ............................................. C12N 11/18
(52) U.S. Cl. .................... 435/262; 435/262.5; 71/6; 210/611; 423/DIG. 17
(58) Field of Search ........................... 435/262, 262.5; 423/DIG. 17; 588/249, 901; 71/6; 210/610, 611

(56) References Cited

U.S. PATENT DOCUMENTS

| | | | | |
|---|---|---|---|---|
| 4,891,320 A | * | 1/1990 | Aust et al. | 435/262 |
| 5,078,899 A | * | 1/1992 | Garrison | 210/704 |
| 5,100,455 A | * | 3/1992 | Pinckard et al. | 71/9 |
| 5,266,213 A | * | 11/1993 | Gillham | 210/747 |
| 5,340,376 A | * | 8/1994 | Cunningham | 71/6 |
| 5,411,664 A | * | 5/1995 | Seech et al. | 210/602 |
| 5,425,881 A | * | 6/1995 | Szejtli et al. | 210/747 |
| 5,443,975 A | * | 8/1995 | Cervelli et al. | 435/175 |
| 5,476,788 A | * | 12/1995 | Lamar et al. | 435/262.5 |
| 5,525,139 A | * | 6/1996 | Gill | 71/9 |
| 5,567,324 A | * | 10/1996 | Rothmel et al. | 210/611 |
| 5,609,667 A | * | 3/1997 | Dickerson | 71/6 |
| 5,609,668 A | * | 3/1997 | Gill | 71/9 |
| 5,618,427 A | * | 4/1997 | Seech et al. | 210/602 |
| 5,789,649 A | * | 8/1998 | Batchelor et al. | 588/206 |
| 5,902,744 A | * | 5/1999 | Gray et al. | 435/262.5 |
| 5,932,472 A | * | 8/1999 | Abdullah | 435/262.5 |
| 6,020,185 A | * | 2/2000 | Hince et al. | 435/262 |
| 6,423,531 B1 | * | 7/2002 | Hince et al. | 435/262 |

* cited by examiner

*Primary Examiner*—David A. Redding

(57) ABSTRACT

The present invention discloses the formulation and use of an advanced solid-media chemical composition which includes both plant-derived and inorganic components which is designed and intended to enhance the removal of a broad range of recalcitrant organic and inorganic contaminants in the environment by providing an improved means of promoting the anaerobic, biologically mediated degradation, transformation, and/or detoxification of the contaminants which may be present in solid and liquid wastes, soils, sediments, and water bodies. The invention provides for improved means of (i) promoting the solid-phase extraction, absorption, and adsorbtion of recalcitrant contaminants from contaminated media, (ii) creating, enhancing, and maintaining anaerobic and highly reducing conditions (i.e., negative Eh values); (iii) providing sources of carbonaceous co-substrates, inorganic, and organic anaerobic electron acceptors, and organic and inorganic nutrients to promote the growth of contaminant-degrading microorganisms, and (iv) providing sources of inoculum of naturally occurring microorganisms which act to promote the biodegradation of contaminants. Additional forms, means, and methods for the production and use of the disclosed solid-chemical composition are also provided to provide additional advantages and to enhance other advantages provided by the composition and/or the components thereof.

27 Claims, 3 Drawing Sheets

US 6,699,707 B1

MICROBIAL ENZYME-ENHANCED ORGANIC-INORGANIC SOLID-CHEMICAL COMPOSITION AND METHODS FOR ANAEROBIC BIOREMEDIATION

CROSS-REFERENCE TO RELATED APPLICATIONS

The present application is a Continuation-In-Part of U.S. patent application Ser. No. 09/441,484 filed Nov. 17, 1999 now U.S. Pat. No. 6,463,531.

BACKGROUND

1. Field of the Invention

This invention discloses the formulation and use of an advanced solid-media chemical composition designed and intended to enhance the removal of halogenated organic contaminants and the oxidized forms of inorganic contaminants from industrial wastes, soils, sediments, sludges, ground waters, surface waters, and the like. In particular, this invention provides an improved means of promoting the anaerobic, biologically mediated degradation, transformation, and/or detoxification of a broad range of recalcitrant and/or hydrophobic halogenated organic and inorganic contaminants in the environment, including, but not limited to, organochlorine pesticides such as DDT and toxaphene; arsenic and/or arsenate-based pesticides; polychlorinated biphenyls (PCBs); dioxins; halogenated organic solvents such as perchloroethylene, trichloroethylene, trichloroethane, and freon; nitroaromatic compounds such as trinitrotoluene and other explosives and/or their byproducts; and toxic inorganic contaminants such as cyanide, hexavalent chromium, and the oxidized forms of other toxic heavy metals. This invention provides improved means for (i) promoting the solid-phase extraction of recalcitrant, hydrophobic contaminants from contaminated media and enhancing the bioavailability and biogeochemical reactivity of such contaminants, (ii) creating, enhancing and maintaining both strongly anaerobic and highly reducing conditions favorable to the biodegradation, dehalogenation, transformation, and/or detoxification of these contaminants by naturally occurring microorganisms, (iii) providing a source of complex carbonaceous co-substrates, anaerobic electron acceptors, and nutrients to promote the growth of these contaminant-degrading microorganisms, and (iv) providing sources of inoculum of different types of naturally occurring microorganisms which act to directly undertake or indirectly promote the biodegradation, dehalogenation, transformation, and/or detoxification of these contaminants. This invention specifically reveals an improved composition and methods for its use for both solid organic and inorganic materials that are designed to promote one or more of the aforementioned processes, as well as for the combination of these solid organic and inorganic materials into the preferred embodiment of a single composition which is both cost-effective and relatively simple to use in the treatment of environmental contamination.

BACKGROUND

2. Description of Prior Art

Soil and ground-water pollution caused by chemical contaminants released into the environment is a well documented, world-wide problem. Such chemical contamination is associated with many different types of industrial activities over the last two centuries. Common environmental contaminants include several different types and forms of petroleum hydrocarbons, halogenated organic compounds including solvents (e.g., tetra- and trichloroethene, methylene chloride), pesticides (e.g., DDT and toxaphene), polychlorinated biphenyls (i.e., PCBs), nitroaromatic compounds, and heavy metals and other inorganic contaminants such as cyanides. The available toxicological data indicates that many of these contaminants, in particular many of the halogenated organic compounds, are either carcinogenic or potentially carcinogenic to both man and animals. In addition, the available environmental and ecological data have shown that many of these contaminants tend to persist in the environment for long time periods and, consequently, they tend to accumulate in the tissues of biological organisms up the food chain. The long-term stability and extremely slow degradation of many such environmental contaminants presents a substantial, long-term hazard to human health and the environment throughout the industrialized world.

Many of the so-called conventional methods for the remediation or clean-up of chemically contaminated wastes, waters, soils, and sediments have generally involved either the physical removal of the contaminated media or the simple mass transfer of the contaminants from one media (e.g., soil) to another (e.g., air). In general, such physical-treatment technologies do not involve the chemically and/or biologically mediated breakdown, transformation, or detoxification of the contaminants. Two of the most common categories of physical environmental remediation technologies are the excavation of contaminated soils and the pumping and subsequent treatment of contaminated ground water. The excavation of contaminated soils is often followed by their disposal in a landfill, which can pose a potential long-term risk to the environment. Many ground-water pump-and-treat processes involve the simple mass-transfer or "stripping" of the contaminants from the water into the air. Another common physical-treatment method involves the use of granular activated carbon (GAC) reactors to treat chemically contaminated waters. When contaminated water is passed through a GAC reactor, the contaminants are physically adsorbed onto the carbon particles, thereby producing another contaminated media which requires subsequent disposal and/or treatment. Each of these physical-treatment technologies share the same disadvantage-i.e., they do not reduce the actual amount or toxicity of the chemical contaminants, but rather they simply move the contamination from one place to another or from one media to another.

Another well-known physical treatment process which involves the thermal treatment or incineration of the contaminated materials can be an effective albeit expensive means of breaking down the molecular structure of the contaminants into non-hazardous products. For example, high-temperature incineration is known to be effective for the treatment of materials containing pesticides and PCBS. Thermal-treatment methods require the use of sophisticated and operation-and-maintenance-intensive equipment, the costs of which are passed on to industry in the form of expensive unit costs for soil treatment. In addition, because thermal-treatment processes are rarely, if ever, one-hundred-percent effective in the destruction of the contaminants, they can produce atmospheric emissions of contaminants or the toxic by-products of contaminants. For example, the incomplete incineration of PCBs can produce dioxins, which in turn are significantly more toxic than their "parent" PCB compounds.

A third category of environmental-remediation treatment technologies, bioremediation, involves the use of microorganisms to convert chemical compounds into innocuous or less harmful chemical compounds. Bioremediation technologies generally have lower costs associated with their use and implementation than do the competing physical technologies. Bioremediation technologies are also more adaptable to different types of contamination problems and variations in field conditions than are physical-treatment technologies.

The most promising bioremediation technologies provide the additional capability of treating contaminated media in-situ, i.e., in place, without the need for ground-water pumping or soil excavation. Current trends in bioremediation technology indicate that the most technically feasible and commercially successful bioremediation technologies are those which utilize indigenous or "native" contaminant-degrading bacteria (CDB), fungi and other microorganisms which are naturally present in the contaminated media. The presence of CDB in many different types of environments has been extensively reported in the scientific literature. There is an extensive body of prior art literature and patents concerning various means of using both aerobic and anaerobic CDB (as well as engineered or cultured bacteria) to biodegrade organic contaminants in water, soil, and industrial wastes. For example, it has been reported that native Alcaligenes spp., Pseudomonas spp., and Enterobacter spp. can degrade a number of pesticides and polychlorinated biphenyls (Nadeau et al., 1994, *Applied and Environmental Microbiology*; Aislabie et al., 1997, *New Zealand Journal of Agricultural Research*; Galli et al., 1992, *Pseudomonas: Molecular Biology and Biotechnology*). Given the significant advantages of using native microorganisms versus the need to introduce cultured or engineered microorganisms, methods which involve the use of artificially introduced microorganisms (e.g., U.S. Pat. No. 5,932,472) are declining in favor within both the scientific and engineering communities. Recent trends in the art and literature acknowledge a growing understanding of the use of anaerobic biological processes in the treatment of many different types of contaminants that are otherwise recalcitrant under aerobic conditions. In particular, trends in the art reflect a growing understanding of the need and importance of achieving and maintaining anaerobic conditions and other factors which favor the biologically mediated reduction, biodegradation, transformation, and/or detoxification of recalcitrant organic and inorganic contaminants in the environment.

The current understanding reflected by the art is that the recalcitrant nature of many halogenated organic contaminants, polynuclear aromatic hydrocarbons (PAHs), other heavy (i.e., high-molecular weight) hydrocarbons, and the like is related to the hydrophobic nature and extremely low solubilities of the contaminants. Consequently, the "bioavailability" of these contaminants, i.e., their availability to biological degradation processes mediated by microorganisms, is extremely limited under most environmental conditions. The prior art describes the use of chemical methods (e.g., Szejtli, et al., U.S. Pat. No. 5,425,881) and thermal methods (e.g., Rothmel, et al., U.S. Pat. No. 5,567,324) to increase bioavailability. For a number of chemically complex hydrophobic chlorinated organic compounds, such as pesticides and PCBs, the prior art has suggested that the higher molecular weight (i.e., more chlorinated) compounds can not be practically biodegraded and thus bioremediation techniques have been all but abandoned with respect to the treatment of such compounds in the environment. For example, through laboratory and pilot-scale experiments directed at the investigation of bioremediation processes on Hudson River sediments contaminated with PCBs, General Electric (GE) researchers determined that the PCBs associated with the sediments consisted of both a labile (i.e., biologically usable) fraction and a resistant (i.e., refractory or relatively non-biologically usable) fraction (General Electric Company, 1992). The labile fraction was described by GE as the lower-molecular weight, less-chlorinated congeners that could be readily desorbed from the sediments. GE described the resistant fraction as the higher-molecular weight congeners that were adsorbed or otherwise bound to the natural organic matrix of the sediments thus greatly limiting their bioavailability to microorganisms. Inoculations with a purified PCB-degrading bacterial strain failed to improve the rate or extent of PCB reduction in the GE experiments. In addition, the GE study did not investigate any means or methods to try to increase the bioavailability of the most recalcitrant PCB congeners. Furthermore, the GE research failed to address or disclose methods or means involving the use of solid or liquid compositions to create and control optimal anaerobic conditions and Eh-pH conditions favorable to the biodegradation of the PCBs.

Alternatively, and in contrast to the present invention, further studies along the lines of GE's prior work have all but given up on the biodegradation of the resistant PCB congeners and have instead focused on the potential reduction of the environmental risks posed by these congeners via the long-term biostabilization of these congeners in the sediments (Gan and Berthouex, 1994; Alcock et al., 1995). These studies have further suggested that PCB biodegradation continues to occur slowly over an extended time frame as specific PCB congeners become bioavailable (Gan and Berthouex, 1994; Alcock et al., 1995).

Unlike the present invention, U.S. Pat. No. 5,789,649 to Batchelor et al. (E.I. du Pont de Nemours and Company) discloses a means for the degradation of contaminants in soil consisting of adding both a "stabilizing agent" and a "reductive zero-valent metal and metal catalyst." In the process disclosed by Batchelor et al. (U.S. Pat. No. 5,789,649), the contaminants are first stabilized within the solid matrix using a "stabilizing agent," such as that comprised of mixtures of bentonite clay and iron chloride. Batchelor et al. (U.S. Pat. No. 5,789,649) further disclose the use of a "reductive zero-valent metal and metal catalyst" which provides for a "metallic couple" which leads to the reductive dehalogenation of the halogenated organic compounds and the consequent reduction of their concentration. Current understanding, however, reflects the need to extract, desorb, solubilize or otherwise remove the contaminants from the solid or non-aqueous phases in order to increase the bioavailability of the halogenated compounds to microorganisms to facilitate their biodegradation. Batchelor et al. (U.S. Pat. No. 5,789,649) do not disclose the chemical composition, methods or means of the present invention.

U.S. Pat. No. 5,266,213 to Gillham and peer-reviewed literature by Gillham and O'Hannesin (Ground Water, 1994) disclose a remediation process limited to the treatment of ground water contaminated with chlorinated aliphatic compounds wherein the contaminated water is fed through a trench or tank containing a metal, such as iron fillings, under strict exclusion of oxygen (Eh values −100 to −200 mV). The contaminant breaks down under such reducing conditions into innocuous by-products. Based on the results of tests in which sodium azide was added to the columns, Gilham et al. concluded that the degradation process was abiotic in nature. Gillham (U.S. Pat. No. 5,266,213) opined that the degradation process involved the abiotic, electrochemical reduction of the iron and the associated reductive dechlorination of the organic compounds from the electrons produced by the reduction of the iron. However, the present invention discloses compositions and methods whereby iron reduction (and the reduction of other metals) coupled to the reductive-dehalogenation of organic contaminants is a biologically mediated process. Therefore, Gillham (U.S. Pat. No. 5,266,213) and Gillham and O'Hannesin (Ground Water, 1994) do not disclose the present invention.

Sayles et al. (*Environmental Science and Technology*, 1997) investigated the utility of using zero-valent iron (e.g., granular iron filings and the like) to dechlorinate DDT and related compounds in an anaerobic aqueous environment. Sayles et al. also acknowledged the importance of providing for a large surface-area of reactive iron, such as that which could be facilitated by the use of a fine particulate or powdered forms of iron. Sayles et al. also investigated the use of a surfactant to increase the availability of DDT to the "chemical" reactions catalyzed by the zero-valent iron. Like Gillham (U.S. Pat. No. 5,266,213) and Gillham and O'Hannesin (Ground Water, 1994), Sayles et al. do not disclose the use of more than a single inorganic amendment (i.e., in addition to the iron) to help optimize or control Eh-pH conditions. Like Gillham (U.S. Pat. No. 5,266,213) and Gillham and O'Hannesin (Ground Water, 1994), Sayles et al. also fail to acknowledge, investigate or otherwise disclose biologically mediated reductive-dehalogenation means, methods, or compositions. Therefore, Sayles et al. does not disclose the present invention.

U.S. Pat. No. 5,902,744 to Gray et al. (Stauffer Management Company) teaches the art of composting organic nutrients (e.g., manure, activated sludge) and a bulking material (e.g., alfalfa) to decontaminate toxic cyclical chlorinated aromatic compounds. The method disclosed by Gray et al. also describes the use of cyclical and/or alternating aerobic and anaerobic treatment steps. Gray et al. does not discuss or disclose the art of using the plant material to increase the bioavailability or biogeochemical reactivity of the contaminants or the use of these plant materials to help create or control anaerobic conditions. Gray et al. also disclose means by which moist air is moved through the compost and chemical reducing agents, such as sulphite and acetate, are added to maintain anaerobic conditions. Unlike the present invention, Gray et al. does not teach or disclose the importance of legume-related or plant-fiber degrading organisms and/or enzymes to bioremediation processes which involve the addition of plant material or means or methods of enhancing the growth and activity of such organisms to optimize the degradation of contaminants in association with plant material. Gray et al. (U.S. Pat. No. 5,902,744) does not disclose the composition or methods of the present invention.

Unlike the present invention, U.S. Pat. No. 5,100,455 to Pinckard and Gill, and U.S. Pat. Nos. 5,525,139 and 5,609,668 to Gill disclose the method of achieving specific carbon-to-nitrogen ratios, i.e., within the range of 10:1 to 30:1, as provided for by composting plant material from the families Leguminosae (e.g., alfalfa) and Gossypium (e.g., cotton) at a rate of up to 20% by volume of the contaminated soil. These patents further disclose methods and means for the composting of the plant material and the prior inoculation of such compost with soil from the chemical spill or with the contaminant(s) of concern at an off-site location by establishing compost windrows in order to establish populations of the indigenous, presumably contaminant-degrading bacteria. Furthermore, the methods and means described by this prior art are unclear as to whether the contaminated materials must be treated at an off-site location or whether the compost can be applied in-situ. These prior art patents also do not teach or disclose the importance of legume-related or plant-fiber degrading microorganisms and enzymes to bioremediation processes which involve the addition of plant-material or means or methods of enhancing the growth and activity of such organisms to optimize the degradation of contaminants in association with the plant material. Accordingly, Pinckard and Gill (U.S. Pat. No. 5,100,455) and Gill (U.S. Pat. Nos. 5,525,139 and 5,609,668) do not disclose the present invention.

U.S. Pat. No. 6,020,293 to Ahmed et al. (Kay Chemical Company) discloses an enzymatic detergent composition for degrading and removing bacterial cellulose buildup in sugar and/or alcohol enriched drains. The cleaners disclosed by Ahmed et al. contain biologically derived acid cellulase enzymes that directly attack native cellulose, native cellulose derivatives, and soluble cellulose derivatives. Ahmed et al. do not disclose the use of this product for the degradation of plant-derived cellulose nor for the application to media other than impacted drains; hence Ahmed et al. does not disclose the compositions or methods of the present invention.

U.S. Pat. No. 5,994,121 to Stolzenburg et al. (RMT, Inc.) discloses means and methods for degrading recalcitrant organic contaminants by applying enzymes derived from Pseudomonas sp. into the affected soil or waste which directly degrade the contamination. Stolzenburg et al. does not disclose the importance of increasing the bioavailability and/or biogeochemical reactivity of the contaminants via the absorption or solid-phase extraction of the contaminants from the environmental media. Likewise, this prior art does not disclose the use of enzymes to break down the materials to which the contaminants have absorbed within or adhered to, thereby greatly increasing the bioavailability of the contaminants to a broad spectrum of naturally-occurring contaminant-degrading microorganisms. Stolzenburg et al., therefore, do not disclose the use of enzymes for the purposes revealed in the present invention.

Burge (*J. Agr. Food Chem.*, 1971) and Guenzi and Beard (*Science*, 1967; *Soil Sci. Soc. Amer.*, 1968) investigated the use of "ground alfalfa" or "alfalfa volatiles" obtained by the distillation of an alfalfa-water slurry to enhance the anaerobic degradation of DDT from soil. Parr and Smith (*Soil Science*, 1976) teach a similar method for the degradation of toxaphene. The results of each of these prior studies indicated that the processes of pesticide dechlorination were both biological and anaerobic in nature. These investigators hypothesized that the addition of the plant material provided energy which in turn increased the rates of contaminant conversion by the microorganisms. None of the prior art described by Burge (*J. Agr. Food Chem.*, 1971), Guenzi and Beard (*Science*, 1967; *Soil Sci. Soc. Amer.*, 1968) and Parr and Smith (*Soil Science*, 1976) disclose the specific chemical compositions or methods for bioremediation of the present invention.

U.S. Pat. No. 5,609,667 to Dickerson (Product Services Co.) discloses means and methods for bioremediation, limited to the bioremediation of hydrocarbon-contaminated soils, which incorporate the use of a solid composition comprised primarily of cotton-lint derived cellulose material (and/or other byproducts of cotton and cotton-seed processing) as well as ammonium sulfate. Dickerson (U.S. Pat. No. 5,609,667) was a continuation-in-part of an abandoned patent application, Ser. No. 08/219,843 filed Mar. 30, 1994. Dickerson (U.S. Pat. No. 5,609,667) specifically discloses the superior "wicking" action of his cotton-lint composition relative to other cellulose-based compositions and clay-mineral based compositions with respect to its ability to remove petroleum hydrocarbons from contaminated soils. Dickerson (U.S. Pat. No. 5,609,667) does not disclose the importance of legume-related or plant-fiber degrading microorganisms and enzymes to bioremediation processes which involve the addition of fibrous plant materials or means or methods of enhancing the growth and activity of such organisms to optimize the degradation of contaminants which become incorporated into the plant materials. Dickerson (U.S. Pat. No. 5,609,667) does not disclose the compositions or methods of the present invention.

U.S. Pat. Nos. 5,411,664 and 5,618,427 to Seech et al. (W. R. Grace) disclose practically identical methods for the respective biodegradation of halogenated aromatic compounds (US. Pat. No. 5,411,664) and nitroaromatic compounds (U.S. Pat. No. 5,618,427). Both patents disclose the use of both fibrous organic matter and multi-valent metal particles to the contaminated media. These patents discuss adding these amendments to soil, water or sediments and subsequently incubating these media under anaerobic conditions conducive to the growth of the indigenous contaminant-degrading microorganisms. Like Dickerson (U.S. Pat. No. 5,609,667), the patents to Seech et al. disclose that the fibrous nature of the plant materials used is important to enable the organic contaminant to become absorbed into the fibrous structure of the plant material which enhances the extent of contaminant removal from the environmental media. Unlike the present invention, Seech et al. also disclose the use of multi-valent metals (preferably iron or magnesium) in combination with the fibrous plant matter wherein the multi-valent metals are specifically capable of being both oxidized and reduced back and forth under normal environmental conditions. Seech et al. do not disclose the importance of legume-related or plant-fiber degrading microorganisms to bioremediation processes which involve the addition of fibrous plant materials or means or methods of enhancing the growth and activity of such organisms to optimize the degradation of contaminants which become incorporated into the plant materials. U.S. Pat. Nos. 5,411,664 and 5,618,427 to Seech et al. do not disclose the chemical compositions or methods taught in the present invention.

U.S. Pat. No. 5,078,899 to Garrison (Idaho Research Foundation, Inc.) discloses a method of treating mine drainage water to remove ferric hydroxide, which is not the subject of the present invention. Although Garrison (U.S. Pat. No. 5,078,899) does not disclose the present invention, the present invention provides for the beneficial use of the wastes produced by the oxidation of mine-drainage waters, e.g., ferric oxides, hydroxides, oxyhydroxides and the like, as a component of the chemical composition disclosed herein.

SUMMARY OF THE INVENTION

In accordance with the present invention there is provided novel and improved solid-chemical composition and associated methods and means for the use of said composition to promote the anaerobic, biologically mediated, degradation, transformation, and/or detoxification of recalcitrant organic and inorganic environmental contaminants present in solid and liquid wastes, soils, sediments, and water into non-hazardous and/or less hazardous by-products, including mineral forms of nitrogen and carbon. The principles of this invention provide for the relatively rapid and cost-effective anaerobic, biologically mediated decontamination of halogenated solvents such as tetrachloroethene (PCE), trichloroethene (TCE), 1,1,1-trichloroethane (1,1,1-TCA), freon, and the like; other recalcitrant halogenated organic compounds such as DDT, toxaphene, PCBs, dioxins, and the like; arsenic-based pesticides; nitroaromatic compounds; recalcitrant hydrocarbon contaminants such as free-phase hydrocarbon fuels (e.g., gasoline, fuel oil), polynuclear aromatic hydrocarbons (PAHs), other heavy hydrocarbons, and the like; and recalcitrant inorganic contaminants such as cyanides, hexavalent chromium, the oxidized forms of other toxic metals, and the like.

A further object of the invention is to present means by which to overcome the disadvantages associated with not only the traditional methods of remediation previously described, but also the limitations of other more recent and/or technically advanced methods and means of chemical-reduction based remediation and bioremediation described in the prior art. The present invention has the further advantage that it can be used effectively either ex-situ or in-situ. A preferred embodiment of the present invention offers the further advantage of providing a means of promoting the bioremediation of contaminated sediments in-situ beneath bodies of natural water such as oceans, lakes, rivers, streams, and the like, and man-made water bodies such as waste-treatment lagoons and the like. The present invention also provides for significant cost savings relative to other means and methods for environmental remediation, as it can reduce or eliminate the need for excavation, pumpage, transportation, and/or off-site treatment of contaminated wastes, soil, or water.

The present invention is based upon discoveries from recent and ongoing experiments that several inter-related conditions must be achieved and maintained within the matrix of the contaminated media to enable the effective biodegradation of recalcitrant organic contaminants in the environment. Accordingly, the purpose of the present invention is to provide a solid-chemical composition and methods and means for its use which serve to: (1) physically extract, absorb and adsorb hydrophobic contaminants from contaminated wastes and environmental media, thereby increasing the bioavailability and/or biogeochemical reactivity of the contaminants; (2) create and maintain strongly anaerobic conditions by facilitating the biologically mediated removal of the available oxygen from the media; (3) create and maintain optimal Eh-pH conditions including strongly negative Eh conditions (Eh values $\leq -200$ millivolts) and near neutral to slightly acidic pH conditions ($6 \leq pH \leq 8$) which favor anaerobic, biologically mediated chemical-reduction reactions, e.g., the reductive dehalogenation of halogenated organic contaminants; and (4) provide means for maintaining conditions (1)–(3) for sufficiently long periods of time to enable the biologically mediated degradation, transformation, and/or detoxification reactions to proceed to the extent that the concentrations and/or toxicity of the contaminants are reduced to acceptable levels.

The discoveries disclosed herein indicate and/or strongly suggest that such contaminants can be effectively degraded, transformed and/or detoxified by indigenous, contaminant-degrading bacteria when the solid-chemical composition disclosed herein are applied to the contaminated media and the media are subsequently maintained under conditions favorable to the anaerobic microorganisms and the biogeochemical reactions mediated by these organisms, i.e., the media are maintained at near-saturation conditions with water. Through a number of experiments conducted by the inventors, it has been further discovered that the organic solid-chemical composition disclosed herein are capable of supporting the growth of indigenous bacterial populations which include both legume-related microorganisms such as Rhizobium spp. and Bradyrhizobium spp. and the like and fiber-degrading (i.e., lignin- and cellulose-degrading) bacteria such as Fibrobacter spp. In addition, the present invention allows for the inclusion of fiber-degrading enzymes such as cellulases, amylases, glucanases, hemi-cellulases, lipases, and proteases. For purposes of explanation and not limitation, it is believed that the aforementioned legume-related and fiber-degrading microorganisms and enzymes greatly enhance the anaerobic biodegradation, transformation, and/or detoxification of recalcitrant contaminants either directly and/or by breaking down the cellulose-containing materials to which the contaminants have become adhered to and/or impregnated within, thereby greatly increasing the bioavailability of the contaminants to a broad spectrum of other microorganisms.

In addition, the solid-chemical composition of the present invention disclosed herein can also provide for the creation and long-term maintenance of a highly anaerobic and reducing environment, i.e., anoxic conditions coupled with strongly negative Eh values, which are required to promote the biodegradation, transformation, and/or detoxification of contaminants via biologically mediated chemical-reduction processes, e.g., reductive dehalogenation. The disclosed solid-chemical composition provides various forms of electrons, organic and inorganic electron acceptors and nutrients, organic and inorganic substrates for microorganisms as well as optional inorganic nutrient forms of nitrogen and phosphorus and optional chelating and acidifying agents. These and other objects and advantages of the present invention will become apparent to those skilled in the art following the detailed description of the invention which reveals the novel combination of solid chemical compositions described herein, and more particularly as defined by the appended claims.

BRIEF DESCRIPTION OF THE FIGURES

Embodiments of the present invention will now be described more fully with reference to the following drawings in which.

DETAILED DESCRIPTION OF THE INVENTION

The present invention disclosed herein provides a unique solid-chemical composition for the bioremediation of wastes and environmental media contaminated with recalcitrant organic and inorganic contaminants. In the practice of the present invention, the disclosed solid-chemical composition would first be prepared by mixing the components together and/or then manufacturing the composition in the form of pellets, tablets, capsules or the like prior to use at a contaminated site. Next, the disclosed solid-chemical composition is applied to, and ideally, mixed into the contaminated media (e.g., sludges, solid and/or liquid wastes, and the like), contaminated soil, sediment, or water, and the like, to promote the anaerobic biodegradation, transformation, or detoxification of the contaminants within said media.

The use as intended of the disclosed solid-chemical composition provides for a combination of means, mechanisms, processes, factors, and capabilities which enhance the anaerobic biodegradation, transformation, and/or detoxification of recalcitrant environmental contaminants including:

(1) The plant-derived components in the disclosed solid-chemical composition promote the physical and biogeochemical extraction, absorbtion and adsorbtion of the hydrophobic substances from the contaminated media, thereby greatly increasing the bioavailability and biogeochemical reactivity of the contaminants to a broad spectrum of contaminant-degrading microorganisms. These plant-derived materials also promote anaerobic and reducing conditions and provide sources of organic substrates, electron acceptors and nutrients for anaerobic microorganisms.

(2) The chemical composition disclosed herein provides combined sources of organic inoculum and substrates for soil, legume-related, plant-fiber degrading microorganisms, and plant-fiber and organic-substrate degrading microorganisms such as Pseudomonas spp., Rhizobium spp., Bradyrhizobium spp., Fibrobacter spp., Clostridium spp., Bacillus spp., Aspergillus spp., Trichoderma spp., Arthrobacter spp., Nocardia spp., and the like. In addition, the composition provides a source of fiber-degrading enzymes such as cellulases,.amylases, glucanases, hemi-cellulases, proteases, and lipases. For purposes of explanation and not limitation, it is believed that the aforementioned legume-related and fiber-degrading microorganisms and enzymes greatly enhance the anaerobic biodegradation, transformation, and/or detoxification of recalcitrant contaminants either directly and/or by breaking down the plant-fiber and organic-substrate materials which in turn make the contaminants which have become adhered to and/or impregnated therein available to a broad spectrum of anaerobic microorganisms. This latter advantage of the present invention represents a major and extremely important advancement in the art. Hence, the solid-chemical composition disclosed herein provides unique advantages which greatly enhance the speed and effectiveness of the anaerobic, biologically mediated biodegradation, transformation, and/or detoxification of recalcitrant contaminants.

(3) The organic materials derived from nitrogen-fixing plants included in the solid-chemical composition disclosed herein provide a combination of carbonaceous co-substrates; nitrogen-based electron acceptors such as nitrates and nitrites; complex nutrient forms of nitrogen such as amines, proteins and enzymes; fatty acids; and complex nutrient forms of phosphorus such as phospholipids for anaerobic soil, legume-related and fiber-degrading microorganisms as well as for other anaerobic microorganisms capable of denitrification processes. Hence, the use of these nitrogen-fixing and/or leguminous plant materials as disclosed in the present invention provides for ideal growth conditions of said microorganisms. In addition, the nitrogenous electron acceptors and nutrients provided by these materials provide a means by which to promote the anaerobic biodegradation of the other organic components of the disclosed chemical composition, as well as the contaminants incorporated therein, by organisms capable of denitrification, metal-reduction and other anaerobic respiration processes.

(4) The solid-chemical composition disclosed herein provides multiple and complimentary sources of inorganic electron acceptors for metal-reducing bacteria such as Geobacter spp., Geovibrio spp., Pelobacter spp., Shewanella spp., Pseudomonas spp., Achromobacter spp., Aeromonas spp., Bacillus spp., Enterobacter spp., Desulfuromonas spp., Desulfovibrio spp., Micrococcus spp. and other metal-reducing microorganisms in the forms of both iron and manganese metallic materials, iron (III) and manganese (IV) containing minerals, and biogeochemically produced ferric oxides, hydroxides and oxyhydroxides.

(5) The solid-chemical composition disclosed herein provides multiple and complimentary sources of electrons which act to create and maintain reducing conditions (Eh values ≦ −200 millivolts) within the matrix of the contaminated media, which in turn helps to catalyze anaerobic, biologically mediated chemical-reduction reactions which promote the biodegradation, transformation and/or detoxification of recalcitrant contaminants.

(6) The solid-chemical composition disclosed herein also includes the use of special types and proportions of inorganic, manganese-containing metals and/or mineral particles which serve as oxidative catalysts for the selective and/or site-specific biogeochemical and/or electrochemical formation, precipitation and/or deposition of metallic oxides, oxyhydroxides, sulfides, carbonates, and the like which would otherwise tend to precipitate onto the surfaces of the inorganic electron-acceptor amendments under the typical Eh-pH conditions created by the use of the solid-chemical compositions disclosed herein. This latter advantage of the present invention represents a major and extremely important advancement in the art, as the metallic manganese and/or manganese (IV) mineral particles provide a means of preserving the availability of the iron-containing components of the composition such that highly reducing and relatively stable low-Eh conditions are maintained for long periods of time relative to other means and methods disclosed in the prior art. Hence, the inorganic components of the solid-chemical composition disclosed herein provide unique advantages which greatly enhance the speed and effectiveness of the anaerobic, biologically mediated reductive dehalogenation of recalcitrant organic contaminants and the biologically mediated reduction of inorganic contaminants.

(7) In addition to the foregoing, and for purposes of explanation and not limitation, the biogeochemically produced (i.e., 'biogenic') ferric oxides, hydroxides, oxyhydroxides and the like which may be included in the solid-chemical composition disclosed herein are believed to provide a unique and important source of inoculum for metal-reducing bacteria such as Geobacter spp., Thiobacillus spp. and the like. Trends in the recent literature indicate or otherwise suggest the such metal-reducing microorganisms play an important role in the "natural" biodegradation, transformation, and/or detoxification of many contaminants in the environment. Hence, inclusion of the biogeochemically produced ferric oxides, hydroxides, and oxyhydroxides in the present invention provides a unique and improved means of enhancing the activity of such microorganisms.

Based on the foregoing and in accordance with the present invention, there are provided means for the enhanced anaerobic microbial degradation, transformation, and/or detoxification of recalcitrant organic and inorganic chemical contaminants in wastes, soils, sediments, and comprising the formulation, processing, and use of a unique solid-chemical composition. The solid-chemical composition of the present invention includes both organic and inorganic components.

In the preferred embodiment of the present invention, the first plant-derived component (a) of the disclosed chemical composition constitutes from 10% to 95% of the total composition by weight and is comprised of the dehydrated, dried, freeze-dried, and/or industrially processed forms of nitrogen-fixing plant materials selected from the plant families Leguminosae and Phaeophyta and/or agriculturally cultivated nitrogen-fixing, leguminous plant materials whereby said plant materials are selected from the plant family Leguminosae. In the preferred embodiment of the present invention in which leguminous materials are used in the disclosed composition, such materials would preferably be selected from the group comprising Lespedeza spp., Medicago ssp. (e.g., alfalfa), Vicia spp. (e.g., vetch), Glycine spp. (e.g., soy), Lathyrus spp. (e.g., indian vetch), Trifolium spp. (e.g., clovers), and the like. In the preferred embodiment of the present invention in which materials from the plant family Phaeophyta are used in the composition, such materials would preferably be selected from the group comprising Sargassum spp. In the preferred embodiment of the present invention, the dehydrated, dried, freeze-dried, and/or industrially or agriculturally processed forms of the nitrogen-fixing plant materials of component (a) are further selected from the group comprising powders, dusts, flours, pellets, meals, mids, husks, hulls, hays, straws, and other commercially available forms of these materials.

In the preferred embodiment of the present invention, inorganic component (b) of the chemical composition constitutes from 1% to 70% of the total composition by weight and is selected from the group comprised of the fine granular and/or powdered forms of porous iron or steel, e.g., the "sponge" iron product Ancor Image 100 manufactured by Hoeganaese and/or the like. Component (b) serves as the primary inorganic source of electrons and inorganic, low-Eh electron acceptors, e.g., ferric iron, for iron-reducing bacteria including but not limited to Geobacter spp., Geovibrio spp., Pelobacter spp., Shewanella spp., Pseudomonas spp., Achromobacterspp., Aeromonas spp., Bacillus spp., Enterobacter spp., Desulfuromonas spp., Desulfovibrio spp., Micrococcus spp., and other microorganisms capable of iron-reduction. Component (b) also serves as an inorganic substrate for said anaerobic, metal-reducing microorganisms. The aforementioned "sponge" form of fine-granular iron or steel is the preferred embodiment of component (b) because of its high surface area and porosity relative to its particle size.

In the preferred embodiment of the present invention, inorganic component (c) of the chemical composition constitutes from 0.01% to 37.5% of the total composition by weight and is selected from the group comprising the fine granular and/or powdered forms of metallic manganese and/or manganese-(IV)-containing minerals such as pyrolusite, psilomelane, and the like. In addition, it is critical that the proportion of component (c) relative to component (b) is such that their weight ratio is in the range of 0.01–0.75. The principle function of component (c) is that it serves as an oxidative catalyst for the selective and/or site-specific biogeochemical and/or electrochemical formation, precipitation and/or deposition of metallic oxides, oxyhydroxides, sulfides, carbonates, and the like. An additional function of component (c) of the composition is that it serves as an additional source of electrons and anaerobic-electron acceptor forms of manganese (IV) for manganese-reducing and other metal-reducing microorganisms capable of manganese-reduction. Component (c) further serves as an additional inorganic substrate for anaerobic, metal-reducing microorganisms.

In the preferred embodiment of the present invention, component (d) of the disclosed chemical composition may constitute from 0.0001% to 3% of the total composition by weight and is comprised of the dehydrated and/or freeze-dried forms of inoculum selected from one or more of the group comprising soil microorganisms (e.g., Pseudomonas spp.), legume-related microorganisms (e.g., Rhizobium spp., Bradyrhizobium spp.), plant-fiber degrading (i.e., lignin- and cellulose-degrading) microorganisms (e.g., Fibrobacterspp., Clostridium spp., and various species of fungi) and metal-reducing microorganisms (e.g., Geobacter spp.), and microorganisms which produce plant fiber and organic substrate degrading enzymes (e.g., Arthrobacter spp., Nocardia spp., Bacillus spp., Aspergillus spp., Trichoderma spp.). In the preferred embodiment of the present invention, particular emphasis is placed on the use of inoculum for plant-fiber degrading microorganisms such as the anaerobic bacteria Fibrobacter spp., Clostridium spp., and the like and/or plant-fiber degrading species of fungi, as well as microorganisms which produce plant fiber and organic substrate degrading enzymes such as Arthrobacter spp., Nocardia spp., Bacillus spp., Aspergillus spp., and Trichodermp spp. Component (d) of the disclosed composition provides the advantage of ensuring for an adequate population of the important types of microorganisms in relatively challenging, difficult, or otherwise unusual remediation applications of the present invention such as the bioremediation of industrial or hazardous wastes, waste lagoons, natural bodies of water (e.g., oceans, rivers, lakes, streams, and the like), or deep sediments or rock formations where such microorganisms may not be sufficiently abundant. It is also believed that organic component (d) of the disclosed composition greatly enhances the anaerobic biodegradation, transformation, and/or detoxification of the contaminants by breaking down the plant-fiber materials which in turn make the contaminants which have become adhered to and/or impregnated therein available to a broad spectrum of anaerobic microorganisms.

In the preferred embodiment of the present invention, an additional organic component (e) would be included in the chemical composition which constitutes 0.0001 % to 3% of the total chemical composition by weight and is comprised of fiber-degrading enzymes such as cellulases, amylases, glucanases, hemi-cellulases, proteases, and lipases. It is believed that organic component (e) of the disclosed composition greatly enhances the anaerobic biodegradation, transformation, and/or detoxification of the contaminants by breaking down the plant-fiber materials which in turn make the contaminants which have become adhered to and/or impregnated therein available to a broad spectrum of anaerobic microorganisms.

In the preferred embodiment of the present invention, another plant-derived component (f of the chemical composition may constitute from 1% to 89% of the total composition by weight. In the preferred embodiment of the present invention, component (f) of the composition would be comprised of industrially processed or agriculturally cultivated plant materials selected from the families Gossypium (e.g., cotton) and Cannabacea (e.g., hops and hemp). The general advantages provided for by the use of plant materials selected from the families Gossypium and Cannabacea is that the physical-extraction of hydrophobic contaminants is enhanced by the fibrous microstructure of such materials as well as by the naturally occurring oils, resins, and other hydrophobic substances present therein. A further distinction of the preferred embodiment of the present invention would include the beneficial use of highly absorbent cotton-containing waste materials such as cotton lint, cotton-mill processing 'dust,' and the like. A distinction of the preferred embodiment of the present invention which includes the use of plant materials selected from the family Cannabacea (e.g., hops and hemp) is that in addition to the fibrous nature of such materials, they contain abundant amounts of relatively insoluble oils, resins, and other hydrophobic substances which should enhance the ability of these materials to physically and/or biogeochemically extract hydrophobic contaminants from contaminated media. Additional advantages of the use of hemp materials in the present invention are the relatively low costs and environmental impacts associated with the production of these plant materials, relative to other agricultural products.

In the preferred embodiment of the present invention, another inorganic component (g) of the disclosed chemical composition may constitute from 0.1% to 40% of the total composition by weight and is selected from the group comprising sodium nitrate, sodium-potassium nitrate, potassium nitrate, ferric nitrate, and/or various manganese nitrates. Component (g) provides both a source of electron acceptors for denitrifying bacteria and other anaerobic microorganisms capable of denitrification processes and an ammonium-free source of nitrates as the sole inorganic form of nutrient nitrogen in the disclosed composition. In the embodiment of the present invention in which component (g) includes ferric nitrate and manganese nitrates, component (g) would also provide electron acceptor and nutrient forms of iron and manganese.

In the preferred embodiment of the present invention, another inorganic component (h) of the disclosed composition may constitute from 0.02% to 20% of the total composition by weight and is selected from the group comprising ringed metaphosphates and/or linear polyphosphates. Component (h) of the disclosed composition provides a source of complex, hydrolyzable phosphates as nutrients for anaerobic microorganisms. The provision of complex metaphosphates and/or polyphosphates provides nutrient phosphorus in forms which are relatively non-reactive geochemically and hence more effectively and efficiently utilized by microorganisms. In addition, the complex phosphates in component (h) also serve as surfactants which enhance the biogeochemical reactivity and bioavailability of organic contaminants.

In the preferred embodiment of the present invention, component (i) the disclosed solid-chemical composition may constitute from 0.01% to 5% of the total composition by weight and is selected from one or more of the group comprising citric acid, humic acid, fulvic acid, sodium citrate, and EDTA. Component (i) of the disclosed composition provides a source of both chelating agents and acidifying agents which help promote anaerobic, biologically mediated metal-reduction processes and other biogeochemical processes which are catalyzed by metals. In the preferred embodiment of the present invention, citric acid is used as some or all of component (i) given that it is not only an effective chelating agent and pH-reducing (i.e., acidifying) agent, but it is a weak organic acid which can help promote microbial processes. The use of humic and/or fulvic acids in component (i) provides similar and complimentary benefits to those described for the use of citric acid.

In the preferred embodiment of the present invention, component 0) of the disclosed chemical composition may constitute from 0.001 % to 15% of the composition by weight and is comprised of one or more biogeochemically produced ferric oxides, hydroxides and oxyhydroxides, such as those associated with acid-mine drainage and/or the treatment by-products thereof. A further distinction of the aforementioned preferred embodiment of the present invention is that such materials would be of the type referred to as "yellow boy" and related materials which are products or by-products of mine drainage wastes and/or the treatment thereof. For purposes of clarification and not limitation, results of the novel research associated with the present invention suggests that in addition to providing another source of electrons and ferric-iron electron acceptors for metal-reducing bacteria, such biogeochemically produced ferric-iron containing materials also serve as inoculum for metal-reducing and oxidizing bacteria such as Geobacter spp., Thiobacillus spp., and the like. Component (0) is also believed to serve as an inorganic substrate for these metal-reducing and metal-oxidizing microorganisms.

In the preferred embodiment of the present invention, an additional plant-derived component (k) may constitute from 0.5% to 30% of the total chemical composition by weight and is comprised of industrially processed or agriculturally cultivated plant materials from the families Triticum and Aegilops (e.g., wheat, oats, and the like). In the preferred embodiment of the present invention, component (k) of the disclosed composition would include the fine particulate, dehydrated, dried, or freeze-dried forms of agriculturally produced materials or wastes which contain wheat, oats, and the like, e.g., pellets, powders, flours, dusts, meals, mids, husks, hulls, straws, or hays. Plant-derived component (k) of the disclosed composition not only provides an additional capacity to physically extract, absorb, or adsorb hydrophobic contaminants, but provides an additional and complimentary source of organic nutrients and carbonaceous co-substrates including complex sugars, starches, cellulose, and lignin. Hence, component (k) of the disclosed composition is believed to enhance the effectiveness of the disclosed composition.

For purposes of explanation and not limitation, it is believed that the plant-derived materials included within the solid-chemical composition disclosed herein have the capacity to physically and/or biogeochemically extract, absorb, and adsorb hydrophobic organic contaminants from contaminated media. In addition, these plant-derived components of the composition provide sources of organic co-substrates, electron donors, electron acceptors, nutrient forms of nitrogen and phosphorus, proteins, and enzymes for promoting the anaerobic bioremediation of contaminants. In addition, these plant materials serve as both a substrate for soil and/or legume-related bacteria such as Pseudomonas spp., Rhizobium spp., Bradyrhizobium spp., and the like, and plant-fiber degrading (e.g., lignin- and cellulose-degrading) bacteria such as Fibrobacterspp., Clostridium spp., plant-fiber degrading fungi and the like. Hence, after the contaminants are absorbed within the plant material, they subsequently become "bioavailable" to a broad spectrum of anaerobic microorganisms via the activity of microorganisms which produce plant fiber and organic substrate degrading enzymes (e.g., Arthrobacterspp., Nocardia spp., Bacillus spp., Aspergillus spp., Trichoderma spp.) and plant fiber and organic-substrate degrading enzymes (e.g., cellulases, amylases, glucanases, hemi-cellulases, lipases, proteases). It is further believed the complex enzymatic capabilities of the fiber-degrading microorganisms may enable these microorganisms to either degrade the contaminants directly or as a co-metabolic function of the degradation of the plant-derived materials included in the chemical composition. Hence, after the contaminants are absorbed within the plant material, the subsequent activity of fiber-degrading microorganisms, fungi, and enzymes greatly enhances the bioavailability and biogeochemical reactivity of the contaminants absorbed within or adhered to the contaminants with respect to a broad range of other anaerobic, contaminant-degrading microorganisms.

For purposes of explanation and not limitation, the benefits of the use of nitrogen-fixing plant materials in the disclosed composition, such as the aforementioned leguminous materials includes the ability of such materials to promote the growth and activity of anaerobic fiber-degrading bacteria, soil and/or legume-related bacteria and many other types of anaerobic microorganisms which are specifically capable of denitrification-processes which utilize the nitrogenous electron acceptors and nutrients present in these materials. In addition, by providing such nitrogen-fixing plant materials in the amounts which comprise at least 20% by weight of the total amount of plant materials provided by components (a), (f) and (k), these materials provide "excess" amounts of electron acceptors, and nutrient forms of nitrogen and phosphorus which promote the biodegradation of the other plant-derived components of the composition as well as the contaminants incorporated therein. Hence, the composition disclosed herein in which the first component of nitrogen-fixing plant materials are combined with the additional plant materials and other components of the composition provide for significant advantages in the promotion of the anaerobic bioremediation of recalcitrant environmental contaminants versus other compositions, methods, and means for bioremediation disclosed in the prior art.

In the preferred embodiment of the present invention, the plant materials provided in components (a), (f) or (k) can either be applied to contaminated media directly in the form of the fine-particulate and/or industrially processed forms of pellets, meals, mids, husks, hulls, hays, or straws or they can be agriculturally cultivated in-situ by direct plantings of seeds or plants in the contaminated soils. In addition to applications in which the plant-derived components (a), (e and (k) are applied together with the other components of the disclosed composition, the plant-derived components can alternatively be applied to the contaminated media before or after the application of the other components of the chemical composition. In the forms of the present invention whereby the plant-derived materials of components (a), (e and (k) are agriculturally cultivated in-situ, such plants could be repeatedly cut and mulched to both increase the in-situ yield (i.e., amount) of these plant materials and to decrease the particle size of these materials in order to enhance their incorporation into the contaminated soils. A further aspect of the preferred embodiment of the present invention involving the agricultural cultivation of these plant materials would involve the overwintering of the plant materials which is believed to enhance the physical and biogeochemical extraction of the hydrophobic contaminants and their biodegradation via the decay of the plant materials in-situ during the dormant, i.e., winter season. For purposes of explanation and not limitation, the aforementioned "overwintering" of the plant materials at sites in which freezing conditions are experienced over the course of a year is believed to greatly enhance the aforementioned advantages of the preferred embodiment of the present invention by freeze-drying and/or freeze-fracturing of these materials, which consequently helps to distribute the plant materials throughout the soil matrix and enhances the ability of these materials to physically and/or biogeochemically extract and/or absorb hydrophobic contaminants. Furthermore, the overwintering process promotes the biodegradation/decomposition of the plant materials, which in turn promotes the anaerobic bioremediation of contaminants by providing a source of cosubstrates, electron donors and acceptors, nutrients, and the like to many different types of microorganisms within the soil matrix.

The disclosed solid-chemical composition of the present invention also provides multiple sources of inorganic electron acceptors for anaerobic, metal-reducing bacteria such as Geobacter spp., Geovibrio spp., Pelobacter spp., Shewanella spp., Pseudomonas spp., Achromobacterspp., Aeromonas spp., Bacillus spp., Enterobacter spp., Desulfuromonas spp., Desulfovibrio spp., Micrococcus spp., and other microorganisms capable of iron reduction, manganese reduction, and the reduction of other metals. Based on information found in the recent literature and the research conducted by the inventors, it is believed that the aforementioned metal-reducing microorganisms play an important if not pre-eminent role in the anaerobic, biologically mediated degradation, transformation, and/or detoxification of recalcitrant contaminants in the environment.

A specific advantage provided for by the unique formulation of the solid-chemical composition disclosed herein is that it serves to create, enhance, and maintain highly reducing (i.e., $Eh \leq -200$ millivolts) conditions within the matrix of contaminated media to which it is applied. Specific means for the maintenance of the highly reducing conditions is provided for by the use of the inorganic component (c), i.e., fine particles of metallic manganese and/or minerals containing manganese (IV), which serve to catalyze the selective and/or site-specific biogeochemical and/or electrochemical formation, precipitation and/or deposition of metallic oxides, oxyhydroxides, sulfides, carbonates, and the like. The said use as intended of component (c) is one of the most important advantages of the present invention over what has previously been disclosed in the prior art. In particular, the use as intended of component (c) causes inorganic minerals such as metallic oxides, oxyhydroxides, sulfides, carbonates, and the like to form at or near the surfaces of the metallic manganese and/or minerals containing manganese (IV) instead of at or near the surfaces of the first inorganic amendment (i.e., sponge-iron particles). The biogeochemical conditions which typically arise from the use of the disclosed chemical composition are such that metallic oxides, oxyhydroxides, sulfides, carbonates, and the like would normally tend to form at or near the surfaces of the sponge-iron particles. However, the use of component (c) acts to control and direct the location of the deposition of the metallic oxides, oxyhydroxides, sulfides, carbonates, and the like away from the surfaces of the sponge-iron particles, leaving the surfaces of the sponge-iron particles available to iron-reducing and other metal-reducing microorganisms thereby maintaining relatively stable, low-Eh conditions (e.g., Eh values$\leq -200$ millivolts) within the contaminated media being treated. Recent experimental data concerning the present invention indicates that it is essential that the disclosed amounts and proportions of component (c) to component (b) be strictly maintained. Recent experimental data has shown that the use of component (c) of the disclosed solid-chemical composition provides an effective means of maintaining the bioavailability of the iron-containing components of the composition, which consequently provides for the long-term maintenance of highly reducing conditions (Eh values$\leq -200$ millivolts) which promote the anaerobic, biologically mediated chemical-reduction processes and reactions which in turn drive the biodegradation, transformation and/or detoxification of recalcitrant contaminants. Accordingly, the enhancement and long-term maintenance of anaerobic and reducing conditions provided for by this unique formulation of the disclosed composition provides for the more rapid and effective biodegradation, transformation and/or detoxification of recalcitrant organic and inorganic contaminants present in solid and liquid wastes, soils, waters, or sediments.

The chemical composition of the present invention disclosed herein can be applied to contaminated media either ex-situ or in-situ to enhance the bioavailability and/or reactivity of recalcitrant organic and inorganic contaminants and to promote the anaerobic biodegradation, transformation, and/or detoxification of these contaminants. In addition, the preferred embodiments of the present invention allows for the chemical composition disclosed herein to be combined and/or processed into such forms that can easily be applied to the contaminated environment in-situ, eliminating the need to excavate the materials and treat in an ex-situ manner. In the practice of the present invention, after the disclosed solid-chemical composition has been applied to the contaminated media, the media would ideally be maintained under conditions favorable for anaerobic microbial growth, i.e., at a moisture content preferably close to 100% of the saturation point or water-holding capacity of the soil or sediment, after the introduction of said chemical composition.

Another aspect of the preferred embodiment of the present invention is the means and/or methods by which the chemical composition disclosed herein is processed into the forms of pellets, capsules, or tablets, which are easier to store, handle and use than other forms of the disclosed chemical composition. In the preferred embodiment of the present invention in which the chemical composition disclosed herein are processed into the form of pellets, capsules, or tablets, it may be necessary or otherwise advantageous to use either organic or inorganic processing and/or binding agents in the manufacture of the pellets, capsules or tablets. In the preferred embodiment of the present invention, the optional processing and/or binding agents may constitute from 0.01% to 7% of the total composition by weight and would be selected from one or more of the group comprising additional plant-derived materials or wastes, starch, molasses, barley malt extract, corn syrup, vegetable oils, mineral oils, surfactants, oil/water emulsions, fats or lards, animal oils, glycerine, gelatine, bentonite, montmorillonite, kaolinite, calcium carbonate, portland cement, and any combinations thereof. In the embodiment of the present invention whereby such organic and/or inorganic processing agents of component (I) are used in the manufacture of pellet, capsule, or tablet forms of the disclosed chemical composition, the relative amounts of the other components (a)–(k) of the disclosed composition would be adjusted downward in a manner which retains the relative proportions of these other components.

The preferred embodiment of the present invention in the form of manufactured pellets, capsules, and/or tablets is similar in form to those manufactured for the animal feed and pellet-fuel industries, such that this form of the present invention can be readily produced by existing and economical means. The preferred embodiment of the present invention in the form of manufactured pellets, capsules, and/or tablets provides means by which the disclosed composition is easier and safer to store, handle, and use than other forms of both the disclosed composition and other means, methods, and compositions for bioremediation disclosed in the prior art. Another aspect of the preferred pellet, capsule, or tablet forms of the solid chemical composition disclosed herein is that the final specific gravity (i.e., density) of the pellets can easily be adjusted so as to be greater than that of water, such that the pellets readily sink in water. In addition, the pellet, capsule, or tablet forms of the composition disclosed herein provides for the delayed, time-release type of interaction between the composition and the contaminated media—consequently these forms provide for the prolonged release of the various amendments incorporated into the composition. Hence, the pellet, capsule, or tablet forms of the disclosed chemical composition would provide the means by which to utilize the composition in more complicated applications, such as in the bioremediation of contaminated sediments in-situ beneath natural waters (e.g., oceans, lakes, rivers, streams, and the like) and man-made water bodies (e.g., waste-treatment lagoons and the like).

As described above, the solid chemical-composition of the present invention disclosed herein provides for unique advantages, means and methods of achieving the relatively rapid and effective anaerobic bioremediation of recalcitrant organic and inorganic contaminants present in wastes, soils, waters, or sediments versus the means and methods disclosed in the prior art. The solid-chemical composition disclosed herein and the means and methods for their intended use overcome many of the disadvantages associated with traditional remediation methods by providing for the efficient and cost-effective remediation of environmental contaminants on a commercial scale with minimal disturbance to the contaminated area. The solid-chemical composition disclosed herein and the means and methods for their intended use also overcome many of the disadvantages associated with the more recent and/or advanced means and methods for the chemical and biological remediation of environmental contaminants disclosed in the prior art.

EXAMPLES

The following examples are provided to illustrate the technical basis, merits and unique advantages provided by the present invention with respect to the treatment of soils contaminated with some of the most extremely recalcitrant contaminants, including the organochlorine pesticides DDT and toxaphene, PCBs, and PAHs. These examples are not to be construed as limiting the present invention in any way, but are merely presented as examples of the unique advantages and non-obvious improvements of the present invention over the prior art and to illustrate the practice of the present invention as described in the appended claims.

Example 1

Prior to the development of the present invention, a pilot-scale test of four different approaches to the anaerobic bioremediation of the recalcitrant, hydrophobic organochlorine pesticides DDT and toxaphene was conducted from April 1996 though April 1997 in order to investigate the combination of different approaches to the implementation of denitrification-based bioremediation and phytoremediation. One trial, initiated in February 1997 and completed in April 1997, involved the use of an embodiment of a previously disclosed "denitrification-based bioremediation" liquid-chemical composition (Hince et al., U.S. Pat. No. 6,020,185). Among other inventions, Hince et al. disclose several liquid-chemical compositions for promoting anaerobic biodegradation of toxic organic and inorganic compounds under anaerobic conditions including denitrifying, manganese-reducing, iron-reducing, and sulfate-reducing conditions.

The pilot study trial which utilized the liquid-chemical composition previously disclosed by Hince et al. was the most effective method tested for the biodegradation of the pesticides DDT and toxaphene, with significant reductions realized over the course of only three months. However, the recent re-analysis of the data from this pilot study, based in part on the knowledge gained from more recent experiments, suggests that the planting of the legume Lespedeza sericia in adjacent areas might have contributed to the observed reductions. In comparison to the optimal test plot, the plots planted with the Lespedeza sericia also realized reductions in the pesticide concentrations, albeit over a longer period (i.e., one year). Despite the fact that upwards of 98–99% reductions of DDT and toxaphene levels were achieved in the most successful pilot-study test plots, the underlying mechanisms and factors responsible for these results were either not well understood or had not yet been identified at that time.

Subsequent to the completion of the initial pilot-scale test, microcosm studies were conducted at a research institution without the use of the solid-chemical composition disclosed herein in an attempt to optimize the formulation and application of the liquid-chemical compositions previously disclosed by Hince et al. (U.S. Pat. No. 6,020,185). As these microcosm studies focused on the optimization of these previously disclosed liquid-chemical compositions, no organic or inorganic compositions, such as plant-derived materials or geochemical amendments, were used in these experiments. These microcosm studies were unable to reproduce the results achieved in the initial pilot study. Nonetheless, the data from these experiments led to further research concerning other means and methods of enhancing the anaerobic biodegradation of the pesticides DDT and toxaphene.

A second pilot-scale test of four different approaches to the anaerobic bioremediation of the pesticides DDT and toxaphene was conducted from December 1998 through June 1999 in order to investigate the use of liquid-chemical compositions previously disclosed by Hince et al. in combination with various inorganic, geochemical compositions. The second pilot-scale test was generally not very successful in reducing organochlorine pesticide concentrations to below the regulatory standards, which combined with the information described in EXAMPLE 2 below, led the inventors to conduct additional experiments to investigate the effects of various organic and inorganic chemical compositions and combinations thereof on pesticide degradation.

Example 2

An investigation was undertaken in the late fall of 1999 to identify the types of bacteria present in uncontaminated, pesticide contaminated (but untreated) and post-treated soils associated with the pilot studies described in EXAMPLE 1. Soil samples representative of these conditions were analyzed using denaturing gradient gel electrophoresis (DGGE) methods to separate and sequence the 16S rDNA genes of the bacteria present. The results of the DGGE 16S rDNA analyses were compared to an international computer database for bacterial DNA. The resultant DGGE "gels" revealed that novel Fibrobacterspp. dominated the microbial community present in the post-treated sample, whereas such species were significantly less abundant in the DGGE gels for the contaminated-but-untreated sample and the "clean" sample. The results also indicated that other novel and/or previously unexpected "adapted" populations of soil and/or legume-related bacteria such as Rhizobium spp. and Bradyrhizobium spp., as well as soil bacteria such as Pseudomonas spp. and Geobacter spp., were evident in the bacterial communities identified in the samples from the contaminated and/or successfully treated locations.

Subsequent investigation of the scientific literature and related research conducted from December 1998 to date have indicated that Fibrobacter spp. are known to be plant-fiber degrading (e.g., lignin- and cellulose-degrading) bacteria for which the "conventional wisdom" and prior art have held are most commonly associated with the breakdown of plant fiber in the rumen of cattle and similar environments.

Furthermore, the available literature indicate that Fibrobacter spp. are anaerobic bacteria. In addition, the subsequent research has indicated that the Rhizobium spp. and Bradyrhizobium spp. are legume-related bacteria associated with the roots of legumes which are responsible for the anaerobic fixation of elemental nitrogen. Moreover, Bradyrhizobium spp. were found to be the specific bacterial symbionts found in association with the roots of Lespedeza spp. Hence, these results led to the novel hypothesis disclosed herein that such fiber-degrading bacteria, (and possibly the legume-related bacteria as well), were either directly responsible for the biodegradation of the pesticides and/or carried out processes which greatly increased the bioavailability of the pesticides to other anaerobic, contaminant-degrading microorganisms.

Example 3

Figure 1:
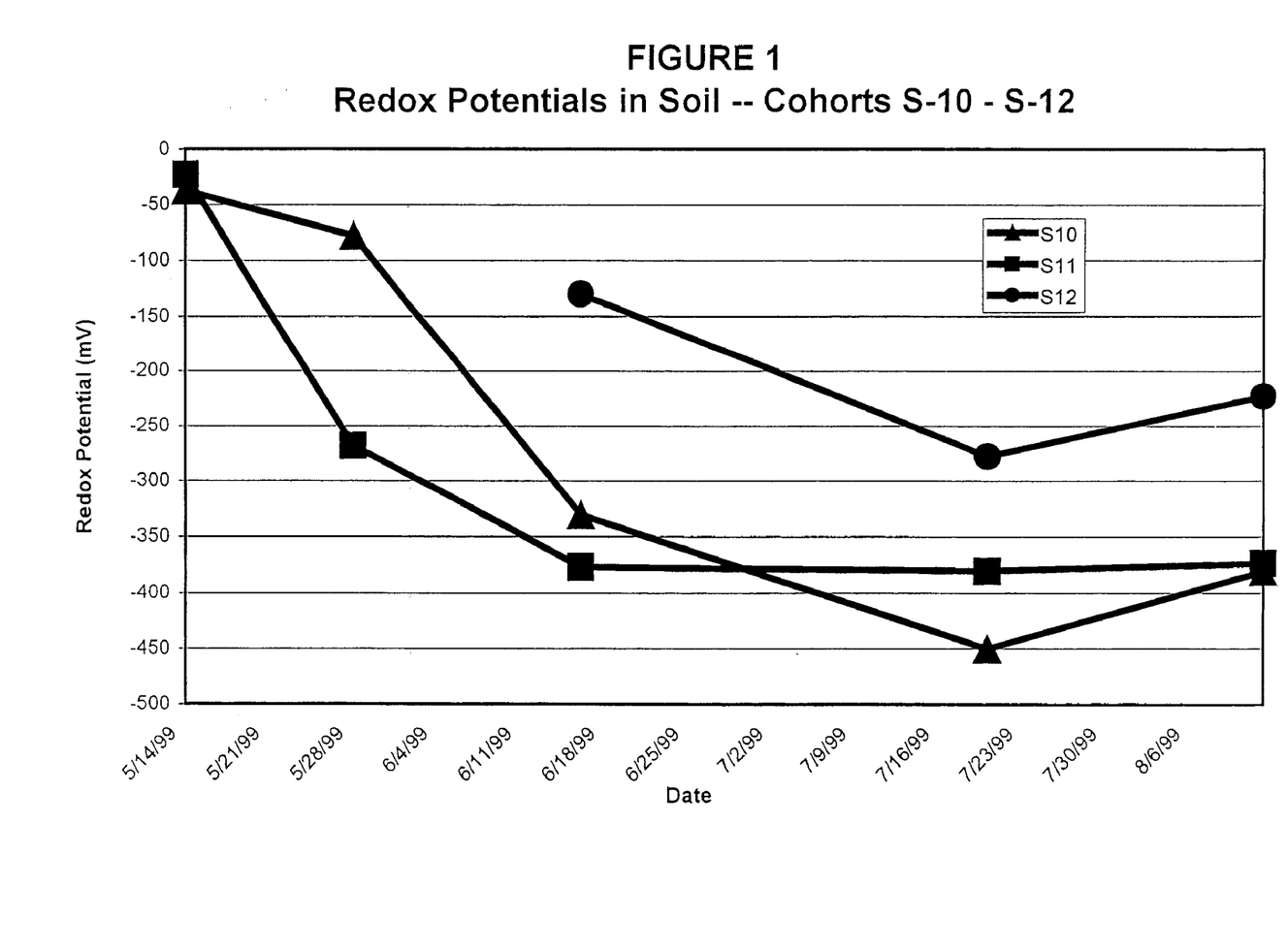
FIG. 1 illustrates the effectiveness of several different embodiments of the disclosed chemical composition of the present invention with respect to control of redox conditions (Eh).
Figure 2:
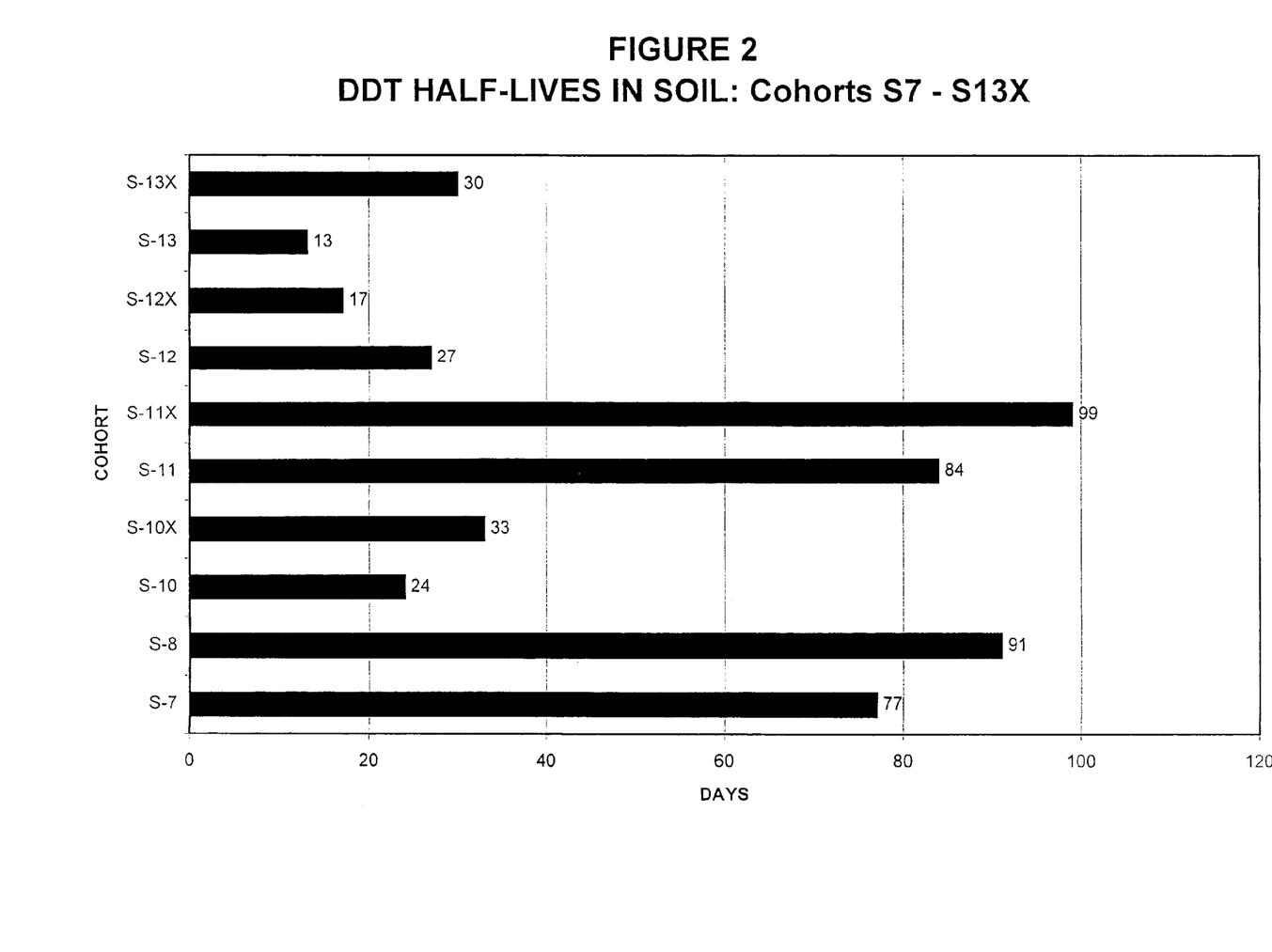
FIG. 2 shows the effect of several different embodiments of the disclosed chemical composition of the present invention on DDT biodegradation rates.

Subsequent to the experiments described above, several additional sets of bench-scale, microcosm experiments were conducted in the laboratory to investigate the effectiveness of different embodiments of the organic solid-chemical composition disclosed herein alone and in combination with a consistent embodiment of the inorganic solid-chemical composition disclosed herein on pesticide degradation. In addition, both a previously disclosed liquid-chemical composition (Hince et al., U.S. Pat. No. 6,020,185) and a novel liquid-chemical composition were used in these experiments. As shown in FIG. 2, experimental cohorts S-10 and S-11 exhibited negative Eh values immediately after treatment followed by a rapid decline in Eh values which stabilized within the range of −300 to −400 millivolts approximately one month after treatment. The most successful cohorts, S-10 and S-11, were treated with the chemical composition disclosed herein comprised of a simplified organic embodiment of composition, i.e., alfalfa meal only, and an inorganic embodiment of composition which included the following components: (i) Ancor Image 100 "sponge iron," a highly porous form of fine granular iron manufactured by the Hoeganaes Corporation, (ii) pyrolusite (i.e., manganese dioxide), and (iii) "yellow boy" (i.e., a biogenic ferric oxyhydroxide obtained from an acid-mine drainage site in Pennsylvania) within the specified concentration ranges and proportions of the present invention as disclosed herein.

Figure 3:
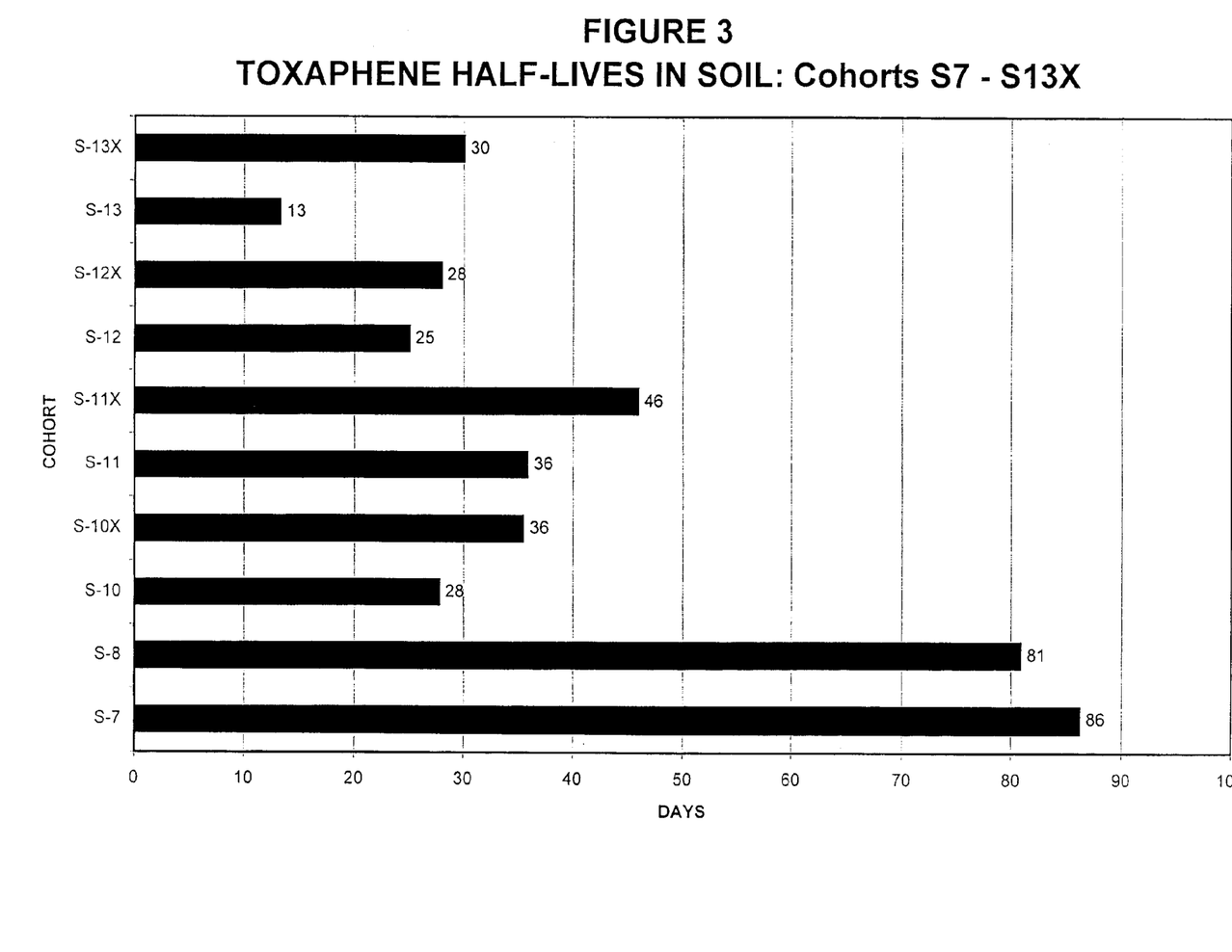
FIG. 3 shows the effect of several different embodiments of the disclosed chemical composition on toxaphene biodegradation rates.

The observed trends in pesticide degradation were found to closely follow the observed trends of low-Eh conditions (and the stabilization thereof. As shown in FIGS. 3 and 4, cohorts S-7 and S-8, which were only treated with an embodiment of the inorganic solid-chemical composition disclosed herein and/or a liquid-chemical composition previously disclosed by Hince et al. (U.S. Pat. No. 6,020,185) demonstrated half-lives on the order of a minimum of three months. Cohorts S-10X, S-11X, and S-12X, which were only treated with an embodiment of the primarily organic solid-chemical composition disclosed herein and a previously disclosed liquid-chemical composition (Hince et al., U.S. Pat. No. 6,020,185) achieved better treatment half-times which ranged from 17-to-99 days for DDT and 28-to-36 days for toxaphene. Cohorts S-10, S-11, and S-12, which were treated with the aforementioned, simplified embodiment of the solid-chemical composition disclosed herein and either novel and/or previously disclosed liquid-chemical compositions, achieved better results (overall) with treatment half-times ranging from 27–81 days for DDT and 25–35 days for toxaphene.

The best overall pesticide-biodegradation results were achieved with treatment Cohort 13, which yielded treatment half-times of 13 days for both DDT and toxaphene. Cohort 13 was treated with an improved embodiment of the chemical composition which included the aforementioned inorganic components of composition and an organic embodiment of the composition which included both alfalfa meal and a cotton lint material.

These data indicate that each of the organic and inorganic components of the chemical composition disclosed herein and used in these experiments effectively promoted the biodegradation of the pesticides. The plant-derived components of the disclosed composition appear to promote the physical and/or biogeochemically mediated solid-phase extraction of the hydrophobic pesticides. The geochemical components of the chemical composition appear to help increase the biogeochemical reactivity of the pesticides, and help to establish and maintain low-Eh conditions, which in turn promote various biogeochemical reactions and processes mediated by anaerobic microorganisms. The data also indicate that the geochemical embodiment of the composition tested provided the specific advantage of helping to create and maintain stable low-Eh conditions for extended time periods which enhances the speed and effectiveness of contaminant biodegradation. The data from these experiments support the conclusion that the preferred embodiment of the present invention represented by experimental cohort S-13, provided the most rapid and effective means for promoting the anaerobic biodegradation, transformation and/or detoxification of DDT and toxaphene.

Example 4

A pilot-scale test was recently initiated which involved the application of the chemical composition disclosed herein to PCB- and PAH-contaminated sludge materials at an industrial site. This sludge material posed the additional challenge in that its solid matrix is primarily comprised of gypsum (i.e., calcium sulfate). Several previous studies have indicated that the presence of sulfates tends to inhibit the microbial degradation of PCBs, PAHs and other recalcitrant contaminants. Nonetheless, the most recent data available from this ongoing experiment has indicated that the levels of PCB aroclors and heavy hydrocarbons in the sludge were reduced by nearly 40% and 55% percent, respectively, 27 days after treatment with the present invention. Other observations, such as a preferential loss of low-molecular weight PCB congeners and shifts in the congener profiles towards less-chlorinated congeners, provides additional evidence that the chemical composition used in this study and disclosed herein is able to effectively and rapidly reduce PCB and PAH levels in the gypsum sludge despite the presence of extremely high levels of sulfate.

The invention has been described with reference to particular embodiments. However, it should be obvious to those skilled in the art to which this invention pertains that other modifications and enhancements can be made without departing from the scope of the claims that follow.

What is claimed is:

1. A solid-chemical composition comprising:
   a. one or more plant materials selected from the group consisting of the plant families Leguminosae and Phaeophyta, from about 10% to 95%, weight percent, of the composition;
   b. a source of iron, being a reducing agent and a microbial electron acceptor for anaerobic respiration, selected from the group consisting of metallic iron particles and steel particles and combinations thereof, from about 1% to 70% by weight percent of the composition;

c. a source of Mn(IV), being an oxidative catalyst and a microbial electron acceptor for anaerobic respiration, selected from the group consisting of metallic manganese particles and particles of manganese (IV) minerals and combinations thereof, from about 0.01% to 37.5%, by weight percent, of the composition;

d. a source of bacteria being a solid-media inoculum for microorganisms, selected from the group consisting of soil bacteria, metal-reducing bacteria, legume-related bacteria, plant-fiber and organic-substrate degrading bacteria, plant-fiber and organic-substrate degrading fungi, bacteria which produce enzymes for plant fiber and organic substrate degradation, and combinations thereof, from about 0.0001% to 3%, by weight percent, of the composition;

e. a source of plant-fiber and organic-substrate degrading enzymes selected from the group consisting of cellulases, amylases, glucanases, hemi-cellulases, proteases, lipases, and combinations thereof, from about 0.0001% to 3%, by weight percent, of the composition.

2. A chemical composition in accordance with claim 1 further comprising one or more plant materials selected from the group consisting of Gossypium and Cannabacea, from about 1% to 89%, by weight percent, of the composition.

3. A chemical composition in accordance with claim 1 further comprising an inorganic source of electron acceptors and an ammonium-free source of inorganic nutrient nitrogen selected from the group consisting of sodium nitrate, sodium-potassium nitrate, potassium nitrate, and combinations thereof, from about 0.1% to 40%, by weight percent, of the composition.

4. A chemical composition in accordance with claim 1, further comprising a source of nutrient phosphorus and a surfactant selected from the group consisting of sodium hexametaphosphate, sodium trimetaphosphate, other biologically hydrolyzable ringed metaphosphates and linear polyghosphates, and combinations thereof, from about 0.02% to 20%, by weight percent of the composition.

5. A chemical composition in accordance with claim 1, further comprising a source of chelating agents, acidifying agents, or organic acids, selected from the group, consisting of citric acid, humic acid, fulvic acid, sodium citrate, nitrilotriacetic acid (NTA), ethylenediaminetetraacetic acid (EDTA), and combinations thereof, from about 0.01% to 5%, by weight percent, of the composition.

6. A chemical composition in accordance with claim 1 further comprising a source of plant material selected from the group consisting of Triticum and Aeqilops and combinations thereof, from about 0.5% to 30%, by weight percent, of the composition.

7. A chemical composition in accordance with claim 1, wherein said plant materials are further selected from the group consisting of Lespedeza spp., Medicago spp., Vicia spp. Glycine spp., Lathyrus spp., Trifolium spp., and combinations thereof.

8. A chemical composition in accordance with claim 1, wherein said plant material is further selected from the marine plant genus Sargassum.

9. A chemical composition in accordance with claim 1, wherein said source of iron comprises sponge iron particles, being a porous form of iron particles.

10. A chemical composition in accordance with claim 1, wherein said source of Mn(IV) is further selected from the group consisting of metallic manganese, pyrolusite, and psilomelane.

11. A chemical composition in accordance with claim 1, wherein said bacteria includes microbial is further selected from the group consisting of Rhizobium spp., Bradyrhizobium spp., Fibrobacter spp., Clostridium spp. Pseudomonas spp., Geobacter spp., Arthrobacter spp., Nocardia spp., Bacillus spp., Aspergillus spp., and Trichoderma spp.

12. A chemical composition in accordance with claim 2, wherein said plant material is selected from the group consisting of cotton lint or other fibrous cotton-containing materials or wastes produced by the cultivation or processing of cotton, cotton plants, and cotton seed.

13. A chemical composition in accordance with claim 2, wherein said plant material is selected from the group consisting of fibrous plant materials or wastes produced by the cultivation or processing of hemp plants or hops plants.

14. A chemical composition in accordance with claim 3, further comprising an inorganic source of electron acceptors and an ammonium-free source of inorganic nutrient nitrogen and either electron-acceptor or nutrient forms of iron and/or manganese for anaerobic microorganisms capable of denitrification processes, selected from the group consisting of ferric nitrate, manganese nitrate, manganese nitrate tetrahydrate, or manganese nitrate hexahydrate.

15. A chemical composition in accordance with claim 1, wherein said bacteria are further selected from the group consisting of microorganisms associated with acid-mine drainage and the waste products produced from the treatment of acid-mine drainage.

16. A chemical composition in accordance with claim 6, wherein said plant material is further selected from one or more of the group consisting of fibrous plant materials and wastes produced by the cultivation or processing of wheat, oats, barley, and rye.

17. A chemical composition in accordance with claims 1, 2, 6, 7, 8, 12, 13, or 16, wherein said components of the composition are in a form selected from the group consisting of powders, flour, pellets, tablets, capsules, meals, mids, husks, hulls, hays, and straws, and combinations thereof.

18. A chemical composition in accordance with claims 1, 2, 6, 7, 8, 12, 13, or 16, wherein said components of the composition are in the dehydrated, dried, or freeze-dried forms.

19. A chemical composition in accordance with any one of claims 1–16, wherein said components of the composition are comprised of medium sand, fine sand, silt- or clay-sized particles, and combinations thereof.

20. A chemical composition in accordance with claims 1, 9, or 10, wherein the proportion of said source of Mn(IV) to said source of iron, by weight, is in the range of 0.01 to 0.75.

21. A chemical composition in accordance with claims 3, 4, or 14, wherein the molar ratios of total nitrate-nitrogen of said nutrient nitrogen to total phosphate-phosphorus of said nutrient phosphorus are in the range of 1:2 to 50:1.

22. A chemical composition in accordance with claims 1, 2, 6, 7, 12, 13, or 16, wherein said plant materials are cultivated in-situ within the contaminated media via the planting and growth of said plants.

23. A chemical composition in accordance with claim 22, wherein said plant materials which are cultivated in-situ are subsequently overwintered in-situ via their exposure to one or more periods of freezing temperatures.

24. A chemical composition in accordance with any one of claims 1–16, wherein any said embodiments of said composition are in the form of pellets, tablets, capsules, or any combinations thereof.

25. A chemical composition in accordance with claim 24, further comprising processing and/or binding agents selected from the group consisting of additional plant-derived materials or wastes, starch, molasses, barley malt extract, corn syrup, vegetable oils, mineral oils, surfactants, oil/water emulsions, fats or lards, animal oils, glycerine, gelatine, bentonite, montmorillonite, kaolinite, calcium carbonate, and portland cement, and any combinations thereof, from 0.01% to 7%, by weight percent, of the composition, wherein the amounts of the other components of the composition by weight are adjusted downward in such manner so as to maintain the relative proportions of said other components.

26. A chemical composition in accordance with any one of claims 1–16 wherein said chemical composition and any embodiment thereof is supplemented with a liquid-chemical composition which contains one or more components selected from the group consisting of nitrates, nitrites, phosphates, surfactants, alcohols, ketones, vegetable oils, mineral oils, sugars, starches, corn syrup, barley malt extract, molasses, humic acids, fulvic acids, chelating agents, and acidifying agents.

27. A method of treating a substance selected from the group comprising:

contaminated industrial solid or liquid waste, hazardous solid or liquid wastes, contaminated environmental soils, sediments, waters, aqueous sludges, and mixtures thereof comprising;

adding the chemical composition according to any one of claims 1–17 at a dosage rate of 0.15 g to 1000 g per Kg of said substance.

* * * * *